3,655,732
FLUORINATED ACRYLIC MONOMERS CONTAINING HETERO ATOMS AND THEIR POLYMERS
Christian Scriver Rondestvedt, Jr., Wilmington, Del., assignor to E. I. du Pont de Nemours and Company, Wilmington, Del.
No Drawing. Filed May 16, 1967, Ser. No. 638,721
Int. Cl. C07c 69/54
U.S. Cl. 260—486 H      3 Claims

ABSTRACT OF THE DISCLOSURE

Perfluoroalkyl acrylic monomers of the formula

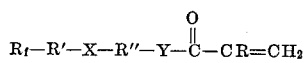

wherein $R_f$ is perfluoroalkyl; $R'$ and $R''$ are each alkylene; X is sulfur or —NR'''—; Y is oxygen, sulfur or —NR'''—; R''' is hydrogen or lower alkyl; and R is hydrogen or methyl. Homopolymers of the above monomers and copolymers of the monomers with copolymerizable vinylidene monomers free of nonvinylic fluorine; both prepared by emulsion polymerization techniques with a free radical catalyst. Mixtures of the above polymers with a polymer derived from a polymerizable vinylidene monomer free of nonvinylic fluorine. Textile fabrics treated with the above polymers and mixtures of polymers to impart oil- and water-repellent properties to the fabric.

The preparation of the monomers from $$R_f—R'—X—R''—YH$$

intermediates.

BACKGROUND OF THE INVENTION

(1) Field of the invention

This invention is related to fluorinated alkyl acrylic monomers and their polymers. More specifically, the invention is directed to perfluoroalkyl containing acrylic monomers having hetero atoms and to polymers derived therefrom.

(2) Description of the prior art

Perfluoroalkyl acrylic monomers having the general formula $R_f(CH_2)_mO_2CR=CH_2$ and $$R_fOCF_2CF_2CH_2O_2CCH=CH_2$$

where $R_f$ is perfluoroalkyl and $m$ is 1 or more are known in the art. However, such monomers having a hetero atom in an alkylene portion of the compound have not heretofore been obtained. Their polymers are useful for imparting oil- and water-repellency to fabrics.

SUMMARY OF THE INVENTION

The perfluoroalkyl acrylic monomers of this invention have the structural formula (1) 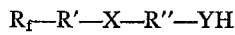

wherein
$R_f$ is a perfluoroalkyl group of four through fourteen carbon atoms;
R is hydrogen or methyl;
$R'$ and $R''$ are each alkylene groups of one through sixteen carbon atoms, with the sum of the carbon atoms of $R'$ and $R''$ being no greater than 25;
X is sulfur (—S—) or —NR'''— where R''' is hydrogen or lower alkyl (one through four carbon atoms); and
Y is oxygen (—O—), sulfur (—S—) or —NR'''—, The invention also includes polymers of the monomers of Formula 1 wherein the portion of the polymeric repeating units due to the monomer of Formula 1 can range from 25% to 100% by weight of the total polymer, and any other repeating units present are derived from at least one copolymerizable vinylidene monomer free of nonvinylic fluorine substituents.

Further, the invention covers a mixture of the polymer of the preceding paragraph and a polymer of at least one polymerizable vinylidene monomer that is free of nonvinylic fluorine substituents, said mixture containing at least 3% by weight of units derived from the monomer of Formula 1.

Lastly, the invention covers textile fabrics treated with any of the polymers of the foregoing two paragraphs in amounts of from 0.1 to 10% by total weight and at least 0.1% by total weight of repeating units derived from the monomer of Formula 1.

DETAILED DESCRIPTION OF THE INVENTION

(A) The monomers

As seen from the definition of Formula 1, the monomers of this invention are the esters, thiolesters or amides of acrylic or methacrylic acid derived from $$R_f—R'—X—R''—Y—H$$

The nature of X and Y in the monomers is not related. That is, the monomers may be denoted by the structural formulas:

(2) 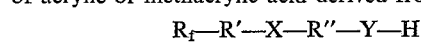

(3) 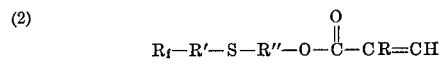

(4) 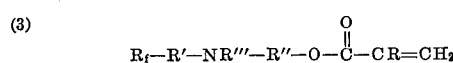

(5) 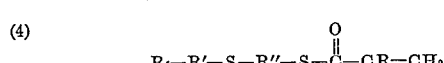

(6) 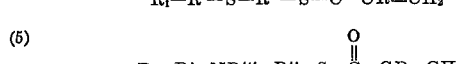

(7) 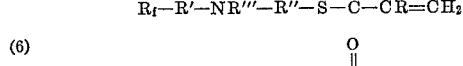

Monomers, and polymers prepared therefrom, of Formulas 2–5 wherein R''' is hydrogen constitute a preferred group.

The perfluoroalkyl ($R_f$) group may be a straight chain perfluoroalkyl $F(CF_2)_n$— where $n$ is 4–14, or a branch chain perfluoroalkyl such as $(CF_3)_2CF(CF_2)_m$— where $m$ is 1–11. Examples are $F(CF_2)_4$—, $F(CF_2)_5$—, $F(CF_2)_6$—, $F(CF_2)_7$—, $F(CF_2)_8$—, $F(CF_2)_9$—
$F(CF_2)_{10}$—, $F(CF_2)_{12}$—, $F(CF_2)_{14}$—
$(CF_3)_2CF(CF_2)_2$—, $(CF_3)_2CF(CF_2)_4$—
$(CF_3)_2CF(CF_2)_6$—, $(CF_3)_2CF(CF_2)_8$—
and the like.

$R'$ and $R''$ are preferably straight chain alkylene groups —$(CH_2)_t$— where $t$ is 1–16 although it is permissible for $R'$ and $R''$ to contain branching in the group. The points of attachement of $R_f$ and X may be on the same or different carbons of $R'$, while the points of attachment of X and Y to $R''$ are preferably on different carbons, i.e., $R''$ preferably contains at least two carbon atoms. Being alkylene groups, $R'$ and $R''$ are free of aliphatic unsaturation and substituents other than hydrogen. Examples of suitable alkylene groups are methylene, ethylene, propylene, butylene, hexamethylene, octamethylene, hexadecamethylene, and the like.

X is a connecting group chosen from divalent sulfur (—S—) or trivalent nitrogen (—NR'''—), attached to a carbon atom in each of the alkylene groups R' and R''. X thus forms a sulfide or amine linkage between R' and R''. When X is trivalent nitrogen —NR'''—, the group R''' may be hydrogen, i.e., X is —NH—, or an alkyl of one to four carbons, e.g., methyl, ethyl, propyl or butyl.

Y is a connecting group chosen from oxygen (—O—), divalent sulfur (—S—) or trivalent nitrogen (—NR'''— where R''' is as above defined). The group, in combination with the group —CO—CR=CH₂, forms an ester thiol ester or amide. As indicated above, X and Y should not be attached to the same carbon of R''. If they were, the products would be aldehyde or ketone derivatives such as acetals, thioacetals or the like which are sensitive to acidic hydrolysis.

The monomers are prepared by a variety of means, all of which involve reaction of the intermediates $R_f$—R'—X—R''—YH with $$CH_2=CR-\overset{O}{\overset{\|}{C}}-Z$$

(Z=OCH₃, OH, halogen), that is esterification, transesterification, or amidation, all of which are well known in the art. The intermediates, $R_f$—R'—X—R''—YH are prepared by a variety of methods illustrated as follows:

One method is to react the mercaptans, $R_f$—R'—SH, or amines, $R_f$—R'—NHR''', with the halides hal—R''—YH e.g., $R_f(CH_2)_mSH + hal—(CH_2)_pYH \rightarrow$ $R_f(CH_2)_mS(CH_2)_pOH$
$R_f(CH_2)_mS(CH_2)_pSH$
$R_f(CH_2)_mS(CH_2)_pNHR'''$ or $R_f(CH_2)_mNHR''' + hal—(CH_2)_pYH \rightarrow$ $R_f(CH_2)_mN(R''')(CH_2)_pOH$
$R_f(CH_2)_mN(R''')(CH_2)_pSH$
$R_f(CH_2)_mN(R''')(CH_2)_pNHR'''$ The mercaptans $R_f$—R'—SH and amines $R_f$—R'NHR''' (particularly where R''' is hydrogen) are known where R' contains one to at least 16 carbons. See, for example, U.S. Pats. 2,894,991; 2,961,470; 3,088,849; 3,172,910; 2,691,043; 3,132,272; and Canadian Pat. 674,578. Many haloalcohols, hal—R'OH, halomercaptans, hal—R'SH, and haloamines, hal—R'—NHR''', are known, for example, hal—(CH₂)ₙOH, n=2–10, hal—(CH₂)₃SH, hal—(CH₂)₂NH₂, hal—CH(CH₃)CH₂NH₂ hal—(CH₂)₃NH₂, hal—(CH₂)₂NHC₂H₅. Where the halomercaptans or haloamines are not available to prepare $R_f$—R'—X—R''—SH or $R_f$—R'—X—R''NHR''', the haloalcohols are usually available, hence $R_f$—R'—X—R''OH is available. These alcohols are readily converted to the mercaptans or amines by well-known processes, i.e.,

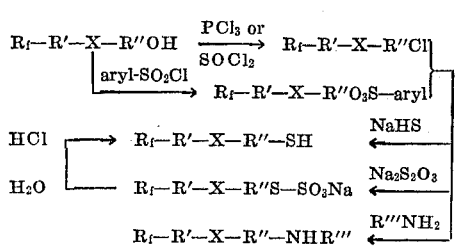

A second general method is to react $R_f$—R'—hal (hal is halogen) with HX—R''—YH, i.e., $R_f$—(CH₂)ₘhal—
+R'''NH(CH₂)ₚOH→$R_f(CH_2)_mN(R''')(CH_2)_pOH$
+NaS(CH₂)ₚOH→$R_f(CH_2)_mS(CH_2)_pOH$
+NaS(CH₂)ₚSH→$R_f(CH_2)_mS(CH_2)_pSH$
+NaS(CH₂)ₚNHR'''→$R_f(CH_2)_mS(CH_2)_pNHR'''$
+R'''NH(CH₂)ₚNHR'''→
$R_f(CH_2)_mN(R''')(CH_2)_pNHR'''$ These procedures are also well known. The halides $R_f$—R'—hal are well known. For example, reaction of $R_fI$ or $R_fSO_2Cl$ with ethylene under free radical conditions gives $R_f(CH_2CH_2)_a$—hal while reaction of $R_fCH_2I$ with ethylene gives $R_fCH_2(CH_2CH_2)_a$—hal, as described in U.S. Pats. 3,088,849; 3,145,222; 2,965,659 and 2,972,638.

The above process cannot be used with $R_fCH_2$—hal or $R_fCH_2CH_2$—hal; the former does not react readily and the latter dehydrohalogenates to $R_fCH=CH_2$. Products of the type $R_fCH_2X$—R'—YH or $R_f$—CH₂CH₂—X—R''—YH are better prepared by the first procedure outlined above.

This procedure also requires the aminoalkanols, mercaptoalkanols, alkylene dithiols or alkylene diamines, e.g.,

NH₂(CH₂)ᵣOH, HS(CH₂)ᵣOH, HS(CH₂)ᵣSH

NH₂(CH₂)ᵣSH and NH₂(CH₂)ᵣNH₂, r=2–10, which are well known.

One only of the above reactions requires special comment, viz., the reaction of $R_f(CH_2)_m$—hal with

HS(CH₂)ₚNHR'''

In the presence of a strong base, the salt

NaS(CH₂)ₚNHR''' forms and reaction at the mercapto group takes place to give $R_f(CH_2)_mS(CH_2)_pNHR'''$ as shown above. In the absence of base, the nitrogen reacts to give $R_f$—(CH₂)ₘN(R''')(CH₂)ₚSH Another, somewhat more limited, process is the reaction of $R_fCH_2O_3S$—aryl or $R_f(CH_2)_2O_3S$—aryl with the above reagents to form $R_f$—$R^{IV}$—N(R''')(CH₂)ₚOH, $R_f$—$R^{IV}$—S(CH₂)ₚOH, $R_fR^{IV}$—S(CH₂)ₚSH, $R_f$—$R^{IV}$—S(CH₂)ₚNR'''H or $R_f$—$R^{IV}$—N(R''')(CH₂)ₚNHR''' where $R^{IV}$ is —CH₂— or —CH₂CH₂—.

Other, special methods are also available, illustrated by the equation below:

$R_f$—R'—SH + CH₂—CH₂ ⟶ $R_f$—R'—S—CH₂CH₂OH
            \O/

$R_f$—R'—NHR''' + CH₂—CH₂ ⟶ $R_f$—R'-(R''')CH₂CH₂OH.
                \O/

$R_f(CH_2)_sS(CH_2)_tCO_2H$ $\xrightarrow{LiAlH_4}$ $R_f(CH_2)_s$—S—(CH₂)ₜCH₂OH
(U.S. 3,172,910)                                    s & t=1–12.

$R_f$—R'—SH + CH₂=CH(CH₂)ᵤYH $\xrightarrow{free\ radical}$
$R_f$—R'—S—(CH₂)ᵤ₊₂YH.

The above-described methods do not, in general, allow preparation of $R_f$—R'—X—CH₂—YH and hence the compounds of the invention $$R_f—R'—X—CH_2Y—\overset{O}{\overset{\|}{C}}—CR=CH_2$$

and these must be prepared by special means, since compounds of the type hal—CH₂—YH or HX—CH₂YH are not generally available. The compounds $R_f$—R'—XH, i.e., $R_f$—R'—SH or $R_f$—R'—NH(R''') readily react with formaldehyde and hydrogen chloride to form $R_f$—R'—S—CH₂Cl or $R_f$—R'—N(R''')CH₂Cl and these halomethyl derivatives easily react with sodium acrylate or methacrylate to form the esters $$R_f\text{—}R'\text{—}S\text{—}CH_2O_2CCR\text{=}CH_2 \text{ and}$$

$$R_f\text{—}R'\text{—}N(R''')CH_2O_2CCR\text{=}CH_2$$

Likewise, the methoxymethyl amides $$CH_2\text{=}CR\text{—}CO\text{—}NH\text{—}CH_2OCH_3$$

under go reaction with $R_f\text{—}R'\text{—}SH$ or $$R_f\text{—}R'\text{—}NH(R''')$$

to displace the methoxy group, usually under acidic conditions, to form $R_f\text{—}R'\text{—}S\text{—}CH_2NHCOCR\text{=}CH_2$ and $R_f\text{—}R'\text{—}N(R''')CH_2NHCOCR\text{=}CH_2$.

(B) The polymers of the invention

The monomers of this invention form homopolymers or copolymers, which are useful oil and water repellents for textiles and the like. To be so useful, the copolymers must contain at least 25% by weight of units derived from the monomer of this invention. The remaining portion of the copolymer contains from 0 to 75% by weight of units derived from copolymerizable vinylidene monomers, defined in greater detail below.

While the above homo and copolymers are useful as oil/water repellents, it has been found that better results are obtained if these homo or copolymers are mixed with separately prepared polymers of one or more polymerizable vinylidene monomers. To be useful repellents, such mixtures must contain at least 3% by weight of units derived from the monomers $$R_f\text{—}R'\text{—}X\text{—}R''\text{—}Y\text{—}\overset{O}{\overset{\|}{C}}\text{—}CR\text{=}CH_2$$

These mixtures may contain any desired proportions of the homo or copolymers of $$R_f\text{—}R'\text{—}X\text{—}R''\text{—}Y\text{—}\overset{O}{\overset{\|}{C}}\text{—}CR\text{=}CH_2$$

and vinylidene polymers so long as the mixture contains 3% or more of the units derived from $$R_f\text{—}R'\text{—}X\text{—}R''\text{—}Y\text{—}\overset{O}{\overset{\|}{C}}\text{—}CR\text{=}CH_2$$

it being understood that any amount greater than 3%, up to 100%, is permissible.

As used herein, the term polymerizable vinylidene monomer includes any compound containing the group $CH_2\text{=}C<$ which will copolymerize with acrylic esters. Vinyl monomers, containing the group $CH_2CH\text{—}$, are a subclass of vinylidene monomers. These vinylidene monomers are free of nonvinylic fluorine, that is fluorine not attached to the carbon of the polymerizable vinylidene group.

The polymerizable vinylidene compounds which are useful in this invention include alkyl acrylates and methacrylates, vinyl esters of aliphatic acids, styrene and alkylstyrenes, vinyl halides, vinylidene halides, allyl esters, vinyl alkyl ketones, certain acrylic type amides and 1,3-butadiene and its derivaties. Representative examples include: methyl acrylate and methacrylate, propyl acrylate and methacrylate, butyl acrylate and methacrylate, isoamyl acrylate and methacrylate, 2-ethylhexyl acrylate and methacrylate, octyl acrylate and methacrylate, octadecylacrylate and methacrylate, lauryl acrylate and methacrylate, cetyl acrylate and methacrylate, N,N-diethylaminoethyl acrylate and methacrylate, vinyl acetate, vinyl propionate, vinyl caprylate, vinyl laurate and vinyl stearate, styrene, α-methylstyrene, p-methyl styrene, vinyl fluoride, vinyl chloride, vinyl bromide, vinylidene fluoride, vinylidene chloride, allyl heptanoate, allyl acetate, allyl caprylate, allyl caproate, vinyl methyl ketone, vinyl ethyl ketone, 1,3-butadiene, 2-chloro-1,3-butadiene, 2,3-dichloro-1,3-butadiene, isoprene, N-methylol acrylamide, N-methylol methacrylamide, glycidyl acrylate and glycidyl methacrylate.

The preferred vinylidene monomers are the alkyl methacrylates. It is often preferable to include a small amount of N-methylol acrylamide as a comonomer with the alkyl methacrylates since durability is increased thereby. The preferred alkyl methacrylates are n-butyl, n-amyl, n-hexyl, isoamyl, 2-ethylhexyl, n-heptyl and n-octyl methacrylates. Styrene, 2,3-dichloro-1,3-butadiene and alkyl acrylates are also quite useful in the present invention but generally less preferably than the methacrylates.

Esters of acrylic and methacrylic acid are well known and, in many cases, commercially available materials, e.g., methyl, ethyl, butyl, 2 - ethylhexyl acrylates and methyl, ethyl, butyl, isobutyl, hexyl, octyl, decyl lauryl, stearyl, N,N - diethylaminoethyl methacrylates. All are readily prepared by esterification of the alcohol and acid in the presence of an acid catalyst.

Vinyl acetate, vinyl 2-ethylhexanoate and vinyl stearate are commercially available. The others are readily prepared by reaction of vinyl acetate with the desired acid in the presence of mineral acid or by reaction of the desired acid with acetylene in the presence of a catalyst.

Styrene, alkyl styrenes, butadiene, chlorobutadiene, dichlorobutadiene and isoprene are well known commercially available compounds. Vinyl and vinylidene halides are also well known and commercially available. Allyl esters are also well known and many are commercially available, e.g., allyl caproate, allyl caproylate, allyl heptanoate, allyl isovalerate and allyl propionate. Methyl vinyl ketone is well known and commercially available. Other alkyl vinyl ketones may be prepared by the reaction of methyl alkyl ketones with formaldehyde in the presence of sulfuric acid. Methylol acrylamide is also commercially available.

In general, the polymers and copolymers of $$R_f\text{—}R'\text{—}X\text{—}R''\text{—}Y\text{—}CO\text{—}CR\text{=}CH_2$$

maybe prepared by any of the known techniques for emulsion polymerization of vinylidene compounds. For emulsion polymerization, the process will be carried out in a reaction vessel fitted with a stirrer and external means of either heating or cooling the charge. The monomer or monomers to be polymerized together is emulsified in a water solution of a surface active agent to a given emulsion concentration of from about 5% to about 50%. Usually the temperature is raised to between 40° C. and 70° C. to effect polymerization in the presence of an added catalyst. A suitable catalyst may be any one of the commonly known agents for initiating the polymerization of an ethylenically unsaturated compound. These include:

2,2'-azodiisobutyramidine dihydrochloride,
2,2'-azodiisobutyronitrile,
2,2'-azobis(2,4-dimethyl-4-methoxyvaleronitrile),
sodium peroxide,
barium peroxide,
hydrogen peroxide,
ammonium persulfate,
potassium persulfate, and the like. The concentration of the catalyst for the polymerization usually is between 0.1% and 2% based on the weight of the monomers. The surface active agents employed to stabilize the emulsion during its makeup and polymerization are anionic, cationic, or nonionic emulsifying agents, but preferably they are the cationic or nonionic type. Representative anionic emulsifying agents are alkyl ($C_{10}$ to $C_{18}$)-sodium sulfate, sodium alkyl ($C_{12}$ to $C_{18}$)-benzenesulfonate, sodium alkylnaphthalenesulfonate, the sodium salt of sulfated alkenyl ($C_{16}$ to $C_{18}$) acetate, sodium oleate, the sodium salt of sulfated methyl oleate, ammonium ω-H-polyfluoroalkanoate ($C_8$ to $C_{10}$), and ammonium perfluoroalkanoate. The cationic agents that may be employed include dodecyltrimethylammonium acetate, trimethyltetradecylammonium chloride, hexadecyltrimethylammonium broide, trimethyloctadecylammonium chloride, (dodecylmethylbenzyl)-trimethylammonium chloride, benzyldodecyldimethylammonium chloride, N - [2 - (diethylamino) ethyl] - oleamide hydrochloride. Nonionic surface active agents that may be employed include condensation products of ethylene oxide with hexylphenol, isooctylphenol, hexadecanol, oleic acid, alkane ($C_{12}$–$C_{16}$)-thiol, alkyl ($C_{12}$–$C_{18}$) amines and the like. In addition, small amounts of chain transfer agents may be present during the polymerization, such as, for example, an alkanethiol of 4 to 12 carbon atoms.

When used as aqueous emulsions, the molecular weight of both type polymers is not a controlling factor as useful repellents are obtained over a wide range of molecular weights.

If the polymers of this invention are to be applied from solution or in aerosol form, it is necessary to control molecular weight to maintain solubility. This is usually done by adding a mercaptan, e.g., dodecyl mercaptan. The polymers may be prepared in solution or in an aqueous emulsion followed by isolation and dissolution in the desired solvent.

Solution polymerization is carried out by dissolving the monomers in the chosen solvent, generally the same solvents as described above for preparing solutions for application, excluding reactive solvents such as toluene, acetone and the like. Soluble initiators such as the acyl peroxides, organic peresters, or azonitriles are used in 5–50% concentration based on monomer weight. Surface active agents are, of course, not required, otherwise the procedure is similar to emulsion polymerization.

(C) The textile fabrics treated by the polymers and polymer mixtures of this invention The polymers and polymeric mixtures described above are useful in treating a variety of textile fabrics to impart oil and water repellency to them. Such treated fibers constitute an embodiment of this invention.

Suitable fabric substrates for the application of the compositions of this invention are films, fibers, yarns, and articles made from filaments, fibers, or yarns derived from natural, modified natural, or synthetic polymeric materials and other porous materials which will absorb and transport low-surface-tension liquids either on their surfaces or in their interstices by capillary action. Specific representative examples are cotton, silk, regenerated cellulose, nylon, fiber-forming linear polyesters, fiber-forming polyacrylonitrile, cellulose nitrate, cellulose acetate ethyl cellulose, paper, fiber glass, wood pressed or otherwise hardened wood composites, metal fabrics, and the like. Dyed and undyed cotton sateen, poplin, broadcloth, jean cloth, gabardine, and the like are especially adaptable for treatment with the compositions of this invention to provide products having a high repellency to oil and water and being relatively unaffected by the action of heat, air and light. Materials rendered oil and water repellent by the invention polymer compositions retain a portion of the original repellent when laundered and dry cleaned.

The compositions may be applied as an aqueous dispersion by brushing, dipping, spraying, padding, roll-coating or by any combination of these methods. For example, dispersions of polymer compositions may be used as a pad bath at a solids content of 0.1% to 10% by weight of the bath. The textile material is padded in this bath, and is then freed of excess liquid, usually by squeeze rolls, so that the dry pickup (weight of the dry polymer on fiber) is between about 0.1% and 10% of the weight of the fiber. The pickup should also be controlled so that the treated material contains at least 0.1% by weight of material of the equivalent of the monomer

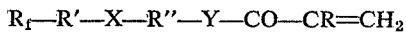

The treated material is then heated at 165° C. to 195° C. for at least about 15 seconds to impart maximum durability of the agent on the material. The resulting textile material or paper will be found to be resistant to water and oil, and the textile material will retain its resistance to such agents even after many launderings and dry cleanings.

The application bath may contain, if so desired, other materials than the polymers described above. For example, additional water repellents, notably waxes, such as paraffin wax, crease resistant agents, sewing lubricants, adjuvants of the melamine-formaldehyde or urea-formaldehyde condensate types and the like which are applied for a variety of purposes to textiles may also be present. Dispersing agents are, of course, also present when the polymers of this invention are used as dispersions. Those skilled in the art will realize that some care is required when preparing complex pad baths to avoid agglomeration, precipitation and the like.

It has been found that complex pad baths will occasionally give poor results due to pad roll buildup. This has been found to be primarily due to the vinylidene polymer. A ready solution to this problem, described more fully by Marascia and Raynolds in U.S. Pat. 3,277,039, is to include a nonconjugated divinylidene monomer in the vinylidene polymer. These vinylidene copolymers are prepared by polymerizing together the vinylidene monomer as previously described and nonconjugated divinylidene monomer. The copolymer should contain from 0.05% to 10% by weight of the divinylidene compound, 0.1% to 5% is preferred. Less than 0.1% of the divinylidene compound does not prevent the formation of the gummy mass obtained during pad roll buildup. More than about 10% of the divinylidene monomer causes the vinylidene copolymer to become increasingly more insoluble and less useful in the oil- and water-repellent compositions of this invention. The nonconjugated divinylidene monomers are also free of nonvinylic fluorine and must contain two polymerizable vinylidene groups. Each vinylidene group must polymerize independently of the other; that is, the two vinylidene groups cannot polymerize together as a unit such as occurs in conjugated divinylidene compounds such as 1,3-butadiene or substituted 1,3-butadienes. These divinylidene compounds may be acrylic type esters of alkanediols, divinyl esters of alkanedioic acids, vinyl esters of acrylic type acids, allylic esters of acrylic type acids, divinyl substituted aromatic compounds and similar related compounds. Representative examples include ethylene glycol diacrylate and dimethacrylate, 1,3-propylene glycol diacrylate and dimethacrylate, tetramethylene glycol diacrylate and dimethacrylate, pentamethylene glycol diacrylate and dimethacrylate, hexamethylene glycol diacrylate and dimethylacrylate, decamethylene glycol diacrylate and dimethylacrylate, diethylene glycol diacrylate and dimethacrylate, divinyl succinate, divinyl adipate, divinyl suberate, divinyl benzene, divinyl toluene, vinyl acrylate and methacrylate, vinyl α-chloroacrylate and allyl acrylate and methacrylate. These divinylidene monomers seem to provide crosslinking in the vinylidene copolymer. The crosslinking seems to prevent formation of the gummy mass previously described.

Other methods for applying the compositions include the use of solutions in place of dispersions and stepwise deposition of the two polymers. Application from solution is carried out in the same ways, in general, as the application of dispersions. Stepwise application involves deposition of the two polymers separately, usually the vinylidene polymer first. Each polymer may be applied either as a dispersion or solution by any of the means described and a curing step may be used after both steps, if desired. The cure after the second application is necessary.

Certain types of fabrics cannot be treated with aqueous dispersions, i.e., cellular polystyrene, puffed fabrics, embossed paper, leather and the like which are sensitive to water or which contain sizes such as starch, gelatin, casein or polyethylene oxide, dyes or other agents which are sensitive to water. Certain puffed or matelassé fabrics are also sensitive to squeezing. These materials are conveniently treated with solutions. A particularly useful method of solution treatment is more fully described in British Pat. 1,058,955 and comprises the use of specific types of copolymers. Such treating bath consists essentially of:

(I) From 0.1 to 50% by weight of the total composition being solids, said solids consisting of (A) from 5% to 97% by weight of total solids of a fluorinated copolymer consisting of
  (1) from about 25% to 99% of monomers $R_f$—R'—X—R''—Y—CO—CR=CH$_2$, as defined above,
  (2) from 0.1 to about 20% by weight of at least one monomer chosen from CH$_2$=C(R)CO$_2$R$^V$OH, CH$_2$=C(R)CONHCH$_2$OH and

CH$_2$=C(R)CO$_2$R$^{VI}$

R being as earlier defined, R$^V$ being an alkylene group of at least two carbons and R$^{VI}$ being an epoxyalkyl of at least three carbons; and
  (3) sufficient vinylidene monomer to make 100% of total copolymer of at least one vinylidene monomer as defined previously that is different from said monomers of (2);

(B) from 0% to 75% of a melamine formaldehyde condensation product; and from 3% to 75% when no (C) component as hereinafter described is present;

(C) from 0% to 75% of at least one vinylidene type polymer chosen from (1) copolymers of long chain alkyl methacrylates and dialkylaminoalkyl methacrylates (2) chlorosulfonated hydrocarbon polymers, (3) polyurethanes containing free isocyanate groups, and (4) copolymers containing the group

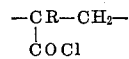

R being H or methyl; from 3% to 75% when no (B) component as heretofore described is preset. Optionally, (D) up to 50% of a wax; the total of the components of said components (A), (B), (C) and (D) when all present being 100% and the sum of components (B) and (C) when present together being at least 3%; and (II) From 50% to 99.5% based on weight of total composition of an organic solvent chosen from hydrocarbons, halogenated hydrocarbons, ketones and esters having a boiling point of from about 25° C. to 180° C.; said polymers of paragraphs (A) and (C) and said melamine derivative of paragraph (B) each being soluble or dispersible in said organic solvent to the extent of from 0.03% to 20% by weight based on weight solvent.

The material is sprayed, dipped or otherwise treated with the above solution, the solvent is evaporated and the material cured at less than 180° C. Useful examples of the melamine-formaldehyde condensates are those described in U.S. Pats. 2,398,569; 2,454,495; 2,529,856; 2,783,231; 2,835,639 and 2,864,781. The copolymers, long chain methacrylates and dialkylaminoalkyl methacrylates are described in British Pat. 915,759. The chlorosulfonated hydrocarbons are described in U.S. Pat. 2,586,363. Useful polyurethanes are disclosed in U.S. Pat. 2,929,800. A useful example of polymers containing the group

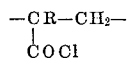

is the terpolymer of ethylene, vinylacetate and methacrylyl chloride. All of these materials must be soluble in the solvents. Useful solvents include the halogenated hydrocarbons, hydrocarbons, ketones and esters having boiling points of 25° to 180° C. Particularly preferred are trichloroethylene, tetrachloroethylene, 1,1,2-trichlorotrifluoroethane, 1,2-difluorotetrachloroethane, benzene, Stoddard Solvent, xylene, benzotrifluoride, hexafluoroxylene, acetone or ethyl acetate. As is indicated, either the melamine-formaldehyde condensate or the wax may be omitted but not both for best results.

The compositions of this invention may also be applied as aerosols, these being particularly useful in the home. Usually, a heat cure is not possible in the home, hence aerosol formulations should preferably not require such. A useful type of formulation not requiring heat cure, based on the formulation described in Netherlands published application 6608665, is identical to the solvent applied embodiment described above except that the component (C) is replaced with a like amount of a vinylidene polymer as previously defined but free of reactive substituents. Useful examples are hydrocarbon polymers, polyacrylic type esters or copolymers with vinyl aromatics such as styrene and elastomers such as the ethylene/propylene/diene terpolymers. Part of the solvents are replaced with aerosol propellents such as dichlorodifluoromethane, monofluorotrichloromethane, dichlorotetrafluoroethane, chlorodifluoroethane or mixtures thereof. The aerosol mixture is sprayed on the fabric until it is wet and the solvent allowed to evaporated.

(D) The examples

The following examples illustrate the present invention. The evaluations for oil and water repellency used the following tests:

The treated fabric samples were evaluated for water repellency using A.A.T.C.C. Standard Test Method 22–1952 of the American Association of Textile Chemists and Colourists. A rating of 100 denotes no water penetration of surface adhesion, a rating of 90 denoates slight random sticking or wetting and so on.

The oil repellency test comprises placing a drop of test solution carefully on the textile on a flat horizontal surface. After three minutes, any penetration or wicking into the fabric is noted visually. The nature of the test solutions is shown below; the Nujol employed is a purified petroleum oil. A rating of 5 or greater means good or excellent repellency; a rating of 2 or over means the treated fabric can be used for certain purposes. As an example, if a treated fabric repels the Numbers 2 through 6 solutions but not the No. 7 solution, its rating is 6.

| Oil repellency rating | Test solution | Surface tension dynes/cm. at 25° C. |
|---|---|---|
| 9 | n-Heptane | 20.0 |
| 8 | n-Octane | 21.8 |
| 7 | n-Decane | 23.5 |
| 6 | n-Dodecane | 25.0 |
| 5 | n-Tetradecane | 26.7 |
| 4 | 50-50 hexadecane-Nujol | 28.7 |
| 3 | 25-75 hexadecane-Nujol | 30.3 |
| 2 | Nujol | 31.2 |

Durability to laundering was determined by immersing the treated fabric sample for 15 minutes with agitation in water at 70–80° C. containing 0.2% by weight of a heavy duty, built detergent, rinsing in boiling water, then cold water and ironing at 235° F. Dry-cleaning durability was determined by agitating the sample 20 minutes in tetrachloroethylene containing 1.5% (weight/volume) of a commercial dry-cleaning detergent (R. R. Street Co., 886 detergent), extraction with tetrachloroethylene, drying for three minutes at 66° C. in a drum and followed by a 15 second pressing at 149° C. on each side of the fabric. As is known in the art (U.S. Pat. 3,068,187), dry cleaning adversely affects water repellency due to soap deposition.

EXAMPLE 1

(A) After degassing, 43 g. of ω-undecylenyl alcohol, 137 g. C$_4$F$_9$I and 0.5 g. azobisisobutyronitrile were heated for 8 hours at 85° under nitrogen. Unreacted iodide was removed at reduced pressure, the residue taken up in 225 ml. 95% ethanol and added dropwise to a slurry of 150 ml. ethanol, 60 g. zinc dust and 30 ml. of concentrated hydrochloric acid. An 87% over-all yield of $$C_4F_9(CH_2)_{11}OH$$

was obtained on pouring the reaction mixture into 400 ml. of water. The alcohol was converted to its p-toluenesulfonate by reaction with p-toluenesulfonyl chloride. Reaction of 20 g. of the sulfonate $$(C_4F_9(CH_2)_{11}O_3SC_6H_4CH_3)$$

1.5 g. sodium hydroxide and 2.5 g. of 2-mercaptoethanol in 150 ml. of moist t-butanol at 80° for 3.5 hours gave a 64% yield of $C_4F_9(CH_2)_{11}S(CH_2)_2OH$.

The position of alkylation was determined by infrared analysis.

(B) To the alcohol, $C_4F_9(CH_2)_{11}S(CH_2)_2OH$ (10.7 g.) at 0° dissolved in 75 ml. of ether was added simultaneously during 8 minutes, two 30 ml. ethereal solutions, one containing 4.2 g. of methacrylyl chloride and one containing 3.2 ml. of pyridine. The mixture was stirred for 1.25 hr. at 0° after completing the addition and finally for one hour at room temperature. The ether solution was washed with 100 ml. of water, 100 ml. of saturated $NaHCO_3$ solution and 100 ml. of water. The ether solution was dried over $MgSO_4$ and the ether evaporated to give 7.9 g. (64%) of the ester, $$C_4F_9(CH_2)_{11}S(CH_2)_2O_2CC(CH_3)=CH_2$$

identified via its infrared spectrum.

(C) The ester (7.9 g.) prepared in Part B was dissolved in a mixture of 2.6 ml. 1,1,2-trichlorotrifluoroethane and 11.4 ml. 1,2-difluorotetrachloroethane containing 0.01 g. of azobis(isobutyronitrile). The solution was heated at 80° C. for 14.5 hours; further 0.1 g. of azonitrile were added at 3, 5.5 and 10.5 hours. Addition of moist methanol to the solution precipitated the homopolymer of $$C_4F_9(CH_2)_{11}S(CH_2)_2O_2CC(CH_3)=CH_2$$

which was then taken up in 1,1,2-trichlorotrifluoroethane. The remainder of the solution was applied to 80 x 80 cotton fabric by dipping to obtain a 4% loading on weight of fabric and cured at 165° C. for three minutes. Evaluation indicated an oil repellency of 2 and a water repellency of 70.

EXAMPLE 2

(A) After degassing, 1422 g. of $C_6F_{13}CH_2CH_2I$ was added during one hour to a refluxing mixture of 1500 ml. of t-butanol, 132 g. of sodium hydroxide and 273 g. of mercaptoethanol. Reflux was continued for an additional hour, most of the solvent removed at 100 mm. and the mixture drowned in water. The washed crude (1259 g.) was distilled to give 1041 g. (82%) of $$C_6F_{13}CH_2CH_2SCH_2CH_2OH$$

B.P. 80–95°/0.5–0.6 mm., $n_D^{25}$ 1.3683–1.3686.

Analysis.—Calc'd for $C_{10}H_9F_{13}OS$ (percen): C, 28.3; H, 2.1; S, 7.6. Found (percent): C, 28.1; 27.9; H, 2.0, 2.0; S, 7.1, 7.0.

(B) The alcohol was converted to the methacrylate $C_6F_{13}CH_2CH_2SCH_2CH_2O_2CC(CH_3)=CH_2$, in 89% yield by tetraisopropyl titanate catalyzed ester interchange with methyl methacrylate, B.P. 89–90° C./0.35 mm.

Analysis.—Calc'd for $C_{14}H_{13}F_{13}O_2S$ (percent): C, 34.2; H, 2.7; F, 50.2; $n_D$ 1.3832, S, 6.5. Found (percent): C, 34.2; 34.6; H, 3.3, 3.1; F, 50.1, 50.0; S, 6.0. 6.1.

(C) The polymer of the methacrylate of part B was prepared by emulsion polymerization using the following ingredients:

| | G. |
|---|---|
| Water | 35 |
| Dimethyloctadecylamine | 0.36 |
| Acetic acid | 0.22 |
| Acetone | 7.91 |
| 2,2'-azobisisobutyramidine hydrochloride | 0.008 |
| Monomer | 10.0 |

The amine, acid and acetone were dissolved in water, which was then heated under reflux for one hour under nitrogen. The solution was cooled to 70° C. and the monomer (previously nitrogen purged) was added followed by the initiator. The mixture was agitated at 70° C. for four hours. An emulsion of the polymer of $C_6F_{13}CH_2CH_2SCH_2CH_2O_2CC(CH_3)=CH_2$ was obtained.

(D) An emulsion was prepared containing 8.1% poly-2-ethylhexyl methacrylate and 5.4% of the fluoropolymer of Part C. This emulsion was used to prepare a pad bath and applied to 5BS cotton poplin to give:

| | Percent product (on weight of fabric) |
|---|---|
| Polymer emulsion (see above) | 2.0 |
| Phobotex FTC [1] | 0.8 |
| Catalyst RB [2] | 0.2 |
| Aerotex M23 Special [3] | 5.0 |
| Magnesium chloride | 0.5 |
| Igepal CO-630 [4] | 0.02 |

[1] Approximately 25% paraffin wax and 75% the reaction product of hexamethoxy methyl melamine with (a) 3 moles stearic acid and (b) 1 mole triethanolamine, neutralized with acetic acid.
[2] Approximately 2 parts aluminum glycollate and one part glycolic acid.
[3] A water-soluble melamine formaldehyde condensate crease-resistance resin.
[4] Nonylphenoxy(polyethyleneoxy)ethanol containing 9–10 ethylene oxide units.

After drying at 171° and a two minute cure at 171°, the following results were obtained:

| | Repellencies | |
|---|---|---|
| | Oil | Water |
| Initial | 6 | 90 |
| 3 launderings | 4 | 80 |
| 3 dry cleanings | 4 | 80 |

EXAMPLE 3

(A) A mixture of 100 ml. toluene and 0.6 ml. concentrated sulfuric acid was heated under reflux in a water separator until dry. Then 84.8 g.

$$C_6F_{13}CH_2CH_2SCH_2CH_2OH$$

(prepared as in Example 2, part (A)), 44.4 g. acrylic acid, 0.3 g. tetramethyldiphenoquinone inhibitor and two drops nitrobenzene were added. The mixture was heated under reflux under a nitrogen atomsphere in a water separator for four hours. Ether was then added and the mixture washed with aqueous sodium bicarbonate. The solution was dried over calcium chloride, the solvent evaporated and the product distilled, giving $$C_6F_{13}CH_2CH_2SCH_2CH_2O_2CCH=CH_2$$

B.P. 77–79° C., 0.1–0.2 mm., 21% yield.

Analysis.—Calc'd for $C_{13}H_{11}F_{13}O_2S$ (percent): C, 32.6; H, 2.3; F, 51.7; S, 6.7. Found (percent): C, 32.7; H, 2.4; F, 52.0; S, 6.6.

(B) The ester $C_6F_{13}CH_2CH_2SCH_2CH_2O_2CCH=CH_2$, (10.0 g.) prepared in part A, was polymerized using the procedure of Example 1, part C. Application of the resulting polymer solution to 80 x 80 cotton fabric as described in Example 1, part C, gave a water repellency of 70 and an oil repellency of 7.

Dip coating a trichlorotrifluoroethane solution on a glass plate gave a film having the following contact angles:

| Solvent | Contact angles, degrees | |
| --- | --- | --- |
| | Advancing | Receding |
| Water | 120 | 40 |
| Hexadecane | 78 | 53 |

EXAMPLE 4

(A) Using the procedure of Example 2, part A, $C_8F_{17}CH_2CH_2I$ was reacted with mercaptoethanol, giving $C_8F_{17}CH_2CH_2SCH_2CH_2OH$ in 97% yield, M.P. 74.5–75.0° C.

*Analysis.*—Calc'd for $C_{12}H_9F_{17}OS$ (percent): C, 27.5; H, 1.7; F, 61.6; S, 6.1. Found (percent): C, 27.2, 27.1; H, 1.8, 1.8; F, 61.4, 61.2; S, 6.0, 5.8.

(B) The above alcohol (21g.), 40 g. methyl methacrylate, 0.6 g. tetramethyldiphenoquinone and 0.2 ml. tetraisopropyl titanate were heated together while allowing methanol to distil from the mixture. The reaction mixture was then distilled giving $$C_8F_{17}CH_2CH_2SCH_2CH_2O_2CC(CH_3)=CH_2$$

in 74% yield, B.P. 128–130° C./0.3 mm.

*Analysis.*—Calc'd for $C_{16}H_{13}F_{17}O_2S$ (percent): C, 32.4; H, 2.2; F, 54.6; S, 5.4. Found (percent): C, 32.5, 32.3; H, 2.1, 2.2; F, 53.8, 53.8; S, 5.1, 5.0.

(C) The fluorinated monomer prepared in part B (10 g.) and 2-ethylhexyl methacrylate (2.5 g.) were copolymerized according to the procedures of Example 1, part C. A film of the polymer on glass, prepared as before, gave the following contact angles:

| Solvent | Contact angles, degrees | |
| --- | --- | --- |
| | Advancing | Receding |
| Water | 125 | 76 |
| Hexadecane | 82 | 76 |

EXAMPLE 5

(A) Using the procedure of Example 2, part A, $C_{10}F_{21}CH_2CH_2I$ was reacted with mercaptoethanol, giving an 88% yield of $C_{10}F_{21}CH_2CH_2SCH_2CH_2OH$, M.P. 109.5–110.5.

*Analysis.*—Calc'd for $C_{14}H_9F_{21}OS$ (percent): C, 26.9; H, 1.5; S, 5.1. Found (percent): C, 26.9, 26.9; H, 1.5, 1.4; S, 4.7, 4.8.

(B) The alcohol was converted to the methacrylate (M.P. 55–56°) in 92% yield by tetraisopropyl titanate catalyzed ester interchange, as described in Example 4, part B.

*Analysis.*—Calc'd for $C_{18}H_{13}F_{21}O_2S$ (percent): C, 31.2; H, 1.9; S, 46.3. Found (percent): C, 31.3, 31.4; H, 1.9, 1.8; S, 4.4, 4.2.

EXAMPLE 6

(A) Using the procedure of Example 2, part A, a mixing of reactants of the formula $C_nF_{2n+1}CH_2CH_2I$ were reacted with mercaptoethanol, giving $$C_nF_{2n+1}CH_2CH_2SCH_2CH_2OH$$

These alcohols were converted to the methacrylate esters using the procedure of Example 4, part B. Analysis by vapor phase chromatography indicated that the esters were:

$C_nF_{2n+1}CH_2CH_2SCH_2CH_2O_2CC(CH_3)=CH_2$ where $n$ is as follows:

| $n=$ | Percent |
| --- | --- |
| 4 | 0.62 |
| 6 | 36.7 |
| 8 | 39.3 |
| 10 | 14.8 |
| 12 | 5.5 |
| 14 | 2.3 |
| 16 | 0.67 |

(B) This mixture of esters was solution polymerized using the procedure of Example 1, part C. Application of the polymer solution (4% on weight of fabric) to 80 x 80 cotton fabric as described in Example 1, part C, gave cotton fabric having a water repellency of 90 and an oil repellency of 7.

A film on a glass plate had the following contact angles:

| Solvent | Contact angles, degrees | |
| --- | --- | --- |
| | Advancing | Receding |
| Water | 125 | 76 |
| Hexadecane | 82 | 76 |

EXAMPLE 7

(A) After degassing a mixture of 150 ml. of t-butanol and 12 ml. of water and 8.4 g. of sodium hydroxide, 25 g. of 1,4-butanedithiol was added and the mixture heated to 80° whereupon 97 g. of $C_6F_{13}CH_2CH_2I$ was added. Heating was continued for 2.5 hours. After cooling, the mixture was added to 250 ml. of water, the nonaqueous phase separated, dried and distilled, giving 45.6 g. (98% based on unrecovered $C_6F_{13}CH_2CH_2I$) of $$C_6F_{13}CH_2CH_2S(CH_2)_4CH$$

B.P. 150° C./1 mm. The structure was confirmed by infrared and NMR spectra.

(B) The thiol prepared in part A was reacted with methacrylyl chloride as described in Example 1, part B, and polymerized in solution with azobisisobutyronitrile as described in Example 1, part C. Cotton fabric treated with the polymer exhibited water and oil repellency (water, 80; oil, 7). A film of the polymer on glass prepared by dip coating from a solution as before had the following contact angles:

| Solvent | Contact angles, degrees | |
| --- | --- | --- |
| | Advancing | Receding |
| Water | 118 | 82 |
| Hexadecane | 78 | 65 |

EXAMPLE 8

(A) After degassing a mixture of 100 ml. of t-butanol, 8.1 g. of sodium hydroxide and 11.4 g. of 2-aminoethanethiol hydrochloride, the mixture was heated to reflux and 47.4 g. of $C_6F_{13}CH_2CH_2I$ was added during 15 minutes. Heating was continued for an additional hour and then the mixture was drowned in water. The nonaqueous phase was separated, dried and distilled, giving 30 g. (71%) of $C_6F_{13}CH_2CH_2SCH_2CH_2NH_2$, B.P. 63°/0.5 mm. $n_D^{25}$ 1.3695.

*Analysis.*—Calc'd for $C_{10}H_{10}F_{13}NS$ (percent): C, 28.4; H, 2.38; N, 3.31; S, 7.56. Found (percent): C, 28.1, 28.3; H, 2.4, 2.3; N, 3.9, 3.7; S, 6.9, 6.9.

The structure was confirmed by infrared and NMR spectra.

(B) The amine of part A was reacted with methacrylyl chloride in the presence of pyridine using standard Schotten-Baumann conditions, giving $$C_6F_{13}CH_2CH_2S\text{—}CH_2CH_2NHCOC(CH_3)=CH_2$$

B.P. 120–121° C./0.05 mm. in 57% yield.

(C) The amide prepared in part (B) was polymerized in solution according to the procedure of Example 1, part (C). The resulting solution was applied to cotton fabric according to Example 1, part (C); water repellency was 90; oil repellency was 7. A film of the polymer on glass, prepared as before, gave the following contact angles:

| Solvent | Contact angles, degrees | |
| --- | --- | --- |
| | Advancing | Receding |
| Water | 125 | 77 |
| Hexadecane | 73 | 67 |

EXAMPLE 9

(A) To 37 g. of 2-aminoethanol dissolved in 125 ml. of t-butanol and heated to 80° was added during 2.5 hours 130 ml. of a t-butanol solution containing 90 g. of the p-toluene sulfonate of $C_6F_{13}CH_2CH_2OH$ (prepared by the reaction of the alcohol with p-toluenesulfonyl chloride). The mixture was heated at 80° for an additional four hours. The reaction mixture was drowned in a mixture of 750 ml. of water and 200 ml. of saturated sodium bicarbonate solution. The nonaqueous phase was taken up in trichlorotrifluoroethane and dried over magnesium sulfate. Removal of the solvent gave 40.1 g. (58%) of $C_6F_{13}CH_2CH_2NH(CH_2)_2OH$ which was converted to the hydrochloride on attempting to recrystallize from carbon tetrachloride. The hydrochloride recrystallized from acetonitrile, M.P. 171–173° C.

*Analysis.*—Calc'd for $C_{10}H_{11}F_{13}ClON$ (percent): C, 27.0; H, 2.5; F, 55.6. Found (percent): C, 27.8; H, 2.5; F, 55.4.

(B) The methacrylate ester was prepared by reaction of the product of part A with methacrylyl chloride as described in Example 1, part (B) (29% yield). After washing with saturated sodium bicarbonate, the monomer was solution polymerized as in Example 1, part (C). The structure was confirmed by its infrared spectrum.

Cotton fabric treated with the polymer solution had, after curing, a water repellency of 80 and an oil repellency of 6.

The foregoing examples are representative only, for any combination of reactants described herein can be employed according to the procedures described to produce the monomers of this invention. Similarly, any of the homopolymers, copolymers and polymeric mixtures described herein can be prepared by the procedures described previously, and can be employed in the treatment of fabrics as described herein.

The foregoing detailed description has been given for clearness of understanding only and no unnecessary limitations are to be understood therefrom. The invention is not limited to the exact details shown and described, for obvious modifications will occur to those skilled in the art.

I claim:

1. A compound of the structural formula

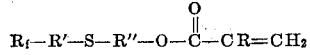

wherein $R_f$ is a perfluoroalkyl group of four through fourteen carbon atoms;

R is hydrogen or methyl; and

R' and R'' are each alkylene groups of one through sixteen carbon atoms, with the sum of the carbon atoms of R' and R'' being no greater than twenty-five.

2. The compound of claim 1 having the structural formula

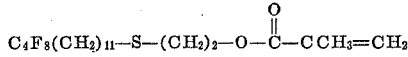

3. The compound of claim 1 having the structural formula

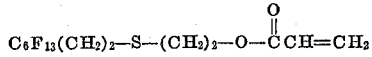

References Cited

UNITED STATES PATENTS 3,238,276    5/1966    La Combe    260—898
3,409,602    11/1968    Anello, et al.    260—89.5

JAMES A. PATTEN, Primary Examiner

P. J. KILLOS, Assistant Examiner

U.S. Cl. X.R.

117—126 GO, 128.4, 135.5, 138.8 A, 138.8 N, 140 A, 141, 145, 148, 155 UA; 260—45.6 R, 455 C, 561 S, 583 EE, 584 R, 607 R